Patented Sept. 2, 1941

2,254,618

UNITED STATES PATENT OFFICE 2,254,618

TREATMENT OF SPENT CATALYSTS

Frank M. McMillan and George S. Parsons, Berkeley, Calif., assignors to Shell Development Company, San Francisco, Calif., a corporation of Delaware No Drawing. Application March 4, 1940, Serial No. 322,208

8 Claims. (Cl. 252—238)

The present invention relates to a method for the recovery and regeneration of spent catalysts. More particularly, the invention relates to the treatment of spent catalysts comprising an aluminum halide, such as anhydrous aluminum chloride or anhydrous aluminum bromide, and an adsorptive carrier, such as an adsorptive alumina or an adsorptive clay.

The aluminum halides are excellent catalysts for a wide variety of reactions. Aluminum chloride, for example, is an excellent catalyst for the alkylation of paraffins with olefines, the isomerization of saturated hydrocarbons, the polymerization of olefines, the cracking of hydrocarbons, Friedel-Craft reactions, and the like. It has recently been found that these catalytic materials are greatly improved when they are combined with certain adsorptive carrier materials. The exceptional properties of these combination catalysts are due largely to a specific promoting action of the carrier and, to a certain extent, to the increase in available surface. The promoting action appears to be dependent to a certain extent upon the chemical composition of the adsorptive carrier, but appears to be more dependent upon the particular character of the surface. Thus, it is generally most pronounced in such cases where the aluminum halide is combined with adsorptive carrier materials containing or consisting essentially of alumina and containing a small amount of firmly-bound water. Although the promoting effect is quite pronounced and is noticed with a considerable number of carriers, it is much more pronounced in some cases than in others. An adsorptive alumina known and sold in the trade as "Activated Alumina," for example, is outstanding in its promoting action, while certain other adsorptive aluminas are much inferior. Also, certain natural occurring activated clays are quite suitable while others appear to possess no promoting action. An adsorptive clay found near Attapulgus, Georgia, for example, is an excellent carrier material. The exact reasons for the divergent results obtained with various carrier materials are not completely understood.

The adsorptive carrier materials which possess the ability to promote the activity of aluminum chloride and are most desired for the preparation of aluminum chloride catalysts, are, as a rule, of limited availability and quite expensive; in fact, they are often considerably more expensive than the aluminum chloride with which they are combined. In order to operate processes commercially using these supported aluminum chloride catalysts, it is therefore highly desirable, and in many cases essential, to recover and regenerate the catalyst when its activity has fallen below a practical value.

In order to recover the spent catalyst and regenerate or reactivate it for reuse, several methods may be used. According to one method, the catalyst is simply impregnated with fresh amounts of aluminum chloride. Although this treatment improves the activity of the catalyst to a certain extent, it does not necessarily restore the original activity of the catalyst and the catalysts reactivated in this way do not always retain their activity well. Certain spent catalysts may be improved somewhat by extraction with appropriate organic solvents. This treatment is sometimes beneficial to catalysts which are visibly discolored, but does not usually effect any substantial improvement. Spent catalysts have also been regenerated by removing the old aluminum chloride and re-impregnating the recovered material with fresh aluminum chloride. One method for removing the old aluminum chloride is to volatilize it off at higher temperatures. This treatment is, however, detrimental to the carrier material and usually almost completely kills its promoting action. The removal of old aluminum chloride by solution has also been tried. Thus, spent catalysts have been treated with water to dissolve out the aluminum chloride. However, this treatment is very detrimental to the carrier material, causing it to disintegrate. Since the reaction of the aluminum chloride in the spent catalysts with water is quite violent and generates considerable heat and this was considered the likely cause for the disintegration of the carrier (excessive pressures caused by the reaction in the microscopic pores of the carrier), it has been attempted to dissolve out the aluminum chloride with a material that reacts with aluminum chloride with less vigor. Thus, the spent catalyst has been treated with hydrochloric acid solutions. This, however, is no appreciable improvement over the action of water. Spent catalysts have also been treated with organic liquids such as ketones, alcohols, ethers, etc. Such treatments are very expensive and do not, in general, effect a satisfactory recovery of the carrier. While the reasons for this are not completely understood, it is believed to be due to the clogging of the fine pores of the carrier.

It has now been found that these difficulties can be overcome and the removal of aluminum halide and organic impurities may be accomplished readily and economically by treating the spent catalyst with aqueous solutions of alkali. It was to be expected that reaction of a strongly acidic aluminum halide with a strong base would be even more violent and exothermic than the reaction with water or acids, and that the alkali would also attack an active material, such as an adsorptive alumina, and render it unfit for further use. However, it has now been shown that neither of these unfavorable effects is actually observed; on the contrary, treatment of spent catalysts comprising aluminum halide impregnated in an adsorptive carrier, such as activated alumina, with a suitable alkali solution, such as a 6N solution of sodium hydroxide, results in a smooth and relatively slow reaction without excessive evolution of heat, so that the reaction mixture remains comparatively cool and no disintegration of the carrier occurs. Furthermore, the alkali is very effective in removing most of the organic impurities, and yet is practically without effect upon the carrier itself.

In its broader aspect, the present process for regenerating spent catalysts of the above-described type comprises the steps of treating the spent catalyst with a base, washing excess base from the extracted carrier, restoring the adsorptive ability of the carrier by a heat treatment, and re-impregnating the carrier to produce regenerated catalysts. The treatment, according to the process of the invention may be effected with any base sufficiently strong to convert aluminum chloride to a soluble aluminate. While there are a large number of applicable bases available, the most practical bases are aqueous solutions of the alkali metal hydroxides, such, for example, as common caustic solutions.

The temperature of the reaction can be controlled if desired so as to carry out the treatment at any desired temperature, but ordinarily no provisions will be made to either heat or cool the mixture.

In the case of granular catalysts, the treatment with the base is conveniently carried out by circulating the basic solution through a mass of the catalyst supported in a suitable manner. If desired, however, the extraction may be effected batchwise, for example, in a tank.

After all or the greater portion of the aluminum chloride is reacted and removed from the carrier by the extraction with a base, the carrier is preferably washed with water or acid solution to remove excess alkali. It is interesting to note, however, that small and even appreciable quantities of alkali remaining in the carrier appear to have no detrimental effect upon the quality of the recovered carrier. The washing does not therefore have to be exceptionally thorough.

After treating the spent catalyst with the base and washing the recovered carrier to remove excess alkali, it is reactivated in one of the customary manners. This may be conveniently effected for example by heating it at a moderately elevated temperature, for instance 300° C., until it substantially ceases to give off water.

The carrier material recovered and reactivated as described is quite suitable for reuse. It may be re-impregnated, and the catalysts prepared from it are practically identical in activity with those made from fresh carrier material. Suitable methods for impregnating the recovered carrier material are described in copending application, Serial No. 292,295 filed August 28, 1939.

The regeneration of spent aluminum chloride catalysts, according to the process of the invention, is illustrated in the following examples.

*Example I*

A catalyst containing 17% aluminum chloride (prepared by adsorbing aluminum chloride vapors by an adsorptive alumina) was used for 67 hours in the isomerization of n-butane, during which time the conversion to iso-butane declined from 65% to 55% (average conversion 60%). The used catalyst which was unchanged in appearance when removed from the reactor was treated with three times its weight of 6 N sodium hydroxide solution, the liquid being circulated through the catalyst mass for 16 hours. The alkali was then drained off, and the alumina washed in a slow stream of water for 65 hours, and then reactivated by drying at 300° C. This material, when impregnated with aluminum chloride vapors, yielded a catalyst containing 18% aluminum chloride. This regenerated catalyst was used for 68 hours in the isomerization of n-butane under the same conditions, and produced an average conversion of 60% for that period.

*Example II*

A supported aluminum chloride catalyst similar to that described in Example I was used for 650 hours for the isomerization of n-butane, during which time its activity gradually decreased, the conversion falling from 66% to 30% in 275 hours, and finally to 17% after 650 hours. That portion of the spent catalyst which was most discolored due to contamination by organic material was treated with a solution of 6 N sodium hydroxide for 18 hours. After draining off the alkali, the alumina was washed with water for 20 hours and then reactivated by drying at 300° C.; 90% of the adsorptive alumina present in the original catalyst was recovered. The recovered alumina was slightly discolored, but when re-impregnated with aluminum chloride it produced a catalyst fully equal in activity to the original cataylst. When used in the isomerization of n-butane under comparable conditions it afforded an initial conversion of 65% and a conversion of 30% after 350 hours of continuous use.

The present method of regenerating spent catalysts may be applied to any supported catalyst of the described class regardless of its activity or concentration of aluminum halide. Thus, the use of the present method does not preclude the use of other temporary reactivation treatments. On the contrary, it may be most advantageously employed in conjunction with other less involved temporary reactivation treatments. For example, a charge of active catalyst may be advantageously employed until its activity is impaired somewhat, given one or more temporary reactivations in situ (for instance, by the addition of a further increment of aluminum chloride) and then, for such temporary activations cease to become sufficiently effective, treating the mass according to the present invention to produce a regenerated catalyst comparable in activity and life with freshly prepared material.

The above examples which are submitted solely to describe the invention and the advantageous results obtainable thereby, are not to be construed as limiting the invention in any manner. We are aware that modifications will be apparent to those skilled in the art and desire our invention to be limited only by the scope of the subjoined claims,

We claim as our invention:

1. A process for regenerating spent catalysts which comprises the steps of treating a catalyst comprising aluminum halide and an adsorptive alumina with a base of sufficient strength to selectively convert the aluminum halide into a soluble aluminate, washing the carrier to remove excess base, drying the washed carrier material, and recombining the recovered carrier with a fresh portion of aluminum halide.

2. A process for regenerating spent catalysts which comprises the steps of treating a catalyst comprising aluminum chloride and an adsorptive clay carrier with a base of sufficient strength to selectively convert the aluminum halide into a soluble aluminate, washing the carrier to remove excess base, drying the washed carrier material, and recombining the recovered carrier with a fresh portion of aluminum chloride.

3. A process for regenerating spent catalysts which comprises the steps of treating a catalyst comprising an aluminum halide and an adsorptive carrier material with an aqueous solution of sodium hydroxide of sufficient strength to selectively convert the aluminum halide into a soluble aluminate, washing the carrier to remove excess sodium hydroxide, drying the washed carrier material, and recombining the recovered carrier with a fresh portion of aluminum halide.

4. A process for regenerating spent catalysts which comprises the steps of treating a catalyst comprising an aluminum halide and an adsorptive mineral carrier containing alumina with a base of sufficient strength to selectively convert the aluminum halide into a soluble aluminate, washing the carrier to remove excess base, drying the washed carrier material, and recombining the recovered carrier with a fresh portion of aluminum halide.

5. A process for regenerating spent catalysts which comprises the steps of treating a catalyst comprising an aluminum halide and an adsorptive carrier material with an aqueous solution of an alkali metal hydroxide of sufficient strength to selectively convert the aluminum halide into a soluble aluminate, washing the carrier to remove excess alkali metal hydroxide, drying the washed carrier material, and recombining the recovered carrier with a fresh portion of aluminum halide.

6. A process for regenerating spent catalysts which comprises the steps of treating a catalyst comprising aluminum chloride and an adsorptive carrier material with a base of sufficient strength to selectively convert the aluminum chloride into a soluble aluminate, washing the carrier material to remove excess base, drying the washed carrier material, and recombining the recovered carrier with a fresh portion of aluminum chloride.

7. A process for regenerating spent catalysts which comprises the steps of treating a catalyst comprising an aluminum halide and an adsorptive carrier material with a base of sufficient strength to selectively convert the aluminum halide into a soluble aluminate, washing the carrier to remove excess base, drying the washed carrier material, and recombining the recovered carrier with a fresh portion of aluminum halide.

8. In a process for the recovery of adsorptive carrier materials from catalysts comprising such carrier materials impregnated with an aluminum halide, the step of treating an adsorptive carrier material containing an appreciable amount of adsorbed aluminum halide with an aqueous alkaline solution of sufficient strength to selectively convert the aluminum halide into a soluble aluminate.

FRANK M. McMILLAN.
GEORGE S. PARSONS.